United States Patent
Kim et al.

(10) Patent No.: US 10,373,317 B1
(45) Date of Patent: Aug. 6, 2019

(54) LEARNING METHOD AND LEARNING DEVICE FOR ATTENTION-DRIVEN IMAGE SEGMENTATION BY USING AT LEAST ONE ADAPTIVE LOSS WEIGHT MAP TO BE USED FOR UPDATING HD MAPS REQUIRED TO SATISFY LEVEL 4 OF AUTONOMOUS VEHICLES AND TESTING METHOD AND TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/254,545

(22) Filed: Jan. 22, 2019

(51) Int. Cl.
  *G06K 9/46* (2006.01)
  *G06K 9/62* (2006.01)
  (Continued)

(52) U.S. Cl.
  CPC .............. *G06T 7/11* (2017.01); *G06K 9/4642* (2013.01); *G06K 9/6257* (2013.01);
  (Continued)

(58) Field of Classification Search
  CPC .. G06K 9/6257; G06K 9/4642; G06K 9/6262; G06N 3/04; G06N 7/005; G06T 7/11
  See application file for complete search history.

(56) References Cited

U.S. PATENT DOCUMENTS 10,157,441 B2 * 12/2018 Chang ..................... G06K 9/628
10,229,346 B1 * 3/2019 Kim ..................... G06K 9/6262
(Continued)

OTHER PUBLICATIONS

Kendall, Alex et al. "Bayesian SegNet: Model Uncertainty in Deep Convolutional Encoder-Decoder Architectures for Scene Understanding." CoRR abs/1511.02680 (2015) (Year: 2015).*

*Primary Examiner* — Utpal D Shah
(74) *Attorney, Agent, or Firm* — Xsensus, LLP

(57) ABSTRACT

A method for an attention-driven image segmentation by using at least one adaptive loss weight map is provided to be used for updating HD maps required to satisfy level 4 of autonomous vehicles. By this method, vague objects such as lanes and road markers at distance may be detected more accurately. Also, this method can be usefully performed in military, where identification of friend or foe is important, by distinguishing aircraft marks or military uniforms at distance. The method includes steps of: a learning device instructing a softmax layer to generate softmax scores; instructing a loss weight layer to generate loss weight values by applying loss weight operations to predicted error values generated therefrom; and instructing a softmax loss layer to generate adjusted softmax loss values by referring to initial softmax loss values, generated by referring to the softmax scores and their corresponding GTs, and the loss weight values.

12 Claims, 4 Drawing Sheets

(51) Int. Cl.
  *G06N 3/04*  (2006.01)
  *G06N 7/00*  (2006.01)
  *G06T 7/11*  (2017.01)

(52) U.S. Cl.
  CPC ............ *G06K 9/6262* (2013.01); *G06N 3/04* (2013.01); *G06N 7/005* (2013.01); *G06T 2207/20081* (2013.01); *G06T 2207/20084* (2013.01)

(56) References Cited

U.S. PATENT DOCUMENTS

| | | | | |
|---|---|---|---|---|
| 2012/0134579 | A1* | 5/2012 | Kameyama | G06T 3/4053 382/159 |
| 2016/0379041 | A1* | 12/2016 | Rhee | G06K 9/00208 382/118 |
| 2017/0206405 | A1* | 7/2017 | Molchanov | G06K 9/00355 |
| 2017/0206434 | A1* | 7/2017 | Nariyambut Murali | G06K 9/628 |
| 2017/0213112 | A1* | 7/2017 | Sachs | G06K 9/66 |
| 2018/0061059 | A1* | 3/2018 | Xu | G06N 3/0454 |
| 2018/0108137 | A1* | 4/2018 | Price | G06T 7/11 |
| 2018/0116620 | A1* | 5/2018 | Chen | A61B 6/03 |
| 2018/0122114 | A1* | 5/2018 | Luan | G06T 7/194 |
| 2018/0211620 | A1* | 7/2018 | Kurokawa | G09G 3/3688 |
| 2018/0293711 | A1* | 10/2018 | Vogels | G06K 9/40 |
| 2018/0293713 | A1* | 10/2018 | Vogels | G06T 7/0002 |
| 2018/0300564 | A1* | 10/2018 | Kwant | G06K 9/00818 |
| 2018/0307980 | A1* | 10/2018 | Bark | G06N 3/0445 |
| 2018/0365824 | A1* | 12/2018 | Yuh | G06K 9/6262 |
| 2019/0015059 | A1* | 1/2019 | Itu | G06F 16/285 |
| 2019/0035101 | A1* | 1/2019 | Kwant | G06T 7/60 |
| 2019/0049540 | A1* | 2/2019 | Odry | G01R 33/5608 |
| 2019/0050653 | A1* | 2/2019 | Natroshvili | G06K 9/00805 |
| 2019/0050981 | A1* | 2/2019 | Song | G06T 7/0012 |
| 2019/0057521 | A1* | 2/2019 | Teixeira | A61B 5/0033 |
| 2019/0079999 | A1* | 3/2019 | Min | G06F 16/335 |
| 2019/0080456 | A1* | 3/2019 | Song | G06T 7/143 |

* cited by examiner

LEARNING METHOD AND LEARNING DEVICE FOR ATTENTION-DRIVEN IMAGE SEGMENTATION BY USING AT LEAST ONE ADAPTIVE LOSS WEIGHT MAP TO BE USED FOR UPDATING HD MAPS REQUIRED TO SATISFY LEVEL 4 OF AUTONOMOUS VEHICLES AND TESTING METHOD AND TESTING DEVICE USING THE SAME

FIELD OF THE DISCLOSURE

The present disclosure relates to a method for attention-driven image segmentation by using at least one adaptive loss weight map to be used for updating HD maps required to satisfy level 4 of autonomous vehicles; and more particularly, a method for image segmentation by using at least one adaptive loss weight map, including steps of: (a) when at least one input image is acquired, (i) instructing an encoding layer of a CNN to generate at least one feature map by applying one or more convolution operations to the input image, and (ii) instructing a decoding layer of the CNN to generate each of segmentation scores corresponding to each of pixels of the input image by applying one or more deconvolution operations to the feature map; (b) instructing a softmax layer of the CNN to generate each of softmax scores corresponding to each of the pixels of the input image by applying softmax operations to each of the segmentation scores; (c) instructing a loss weight layer of the CNN (i) to generate each of predicted error values corresponding to each of the pixels of the input image by referring to the softmax scores and their corresponding GT values, and (ii) to generate each of loss weight values corresponding to each of the pixels of the input image by applying loss weight operations to each of the predicted error values, wherein the loss weight operations allow differences among each of the loss weight values to be larger than those among each of the predicted error values; and (d) (i) instructing a softmax loss layer of the CNN (1) to generate each of initial softmax loss values corresponding to each of the pixels of the input image by referring to each of the softmax scores and their corresponding GT values, and (2) to generate each of adjusted softmax loss values corresponding to each of the pixels of the input image by referring to each of the initial softmax loss values and each of the loss weight values, and (ii) learning parameters of the CNN by backpropagating the adjusted softmax loss values, and a learning device, a testing method, and a testing device using the same.

BACKGROUND OF THE DISCLOSURE

Deep Convolution Neural Networks, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of machine learning.

Meanwhile, image segmentation is a method of generating a label image using an input image, e.g., a training image, a test image. Recently, the Deep Learning has been so much widespread that the Deep Learning is being applied to the image segmentation.

When learning parameters of the CNN for the image segmentation, basically all areas in the image are learned with a same weight. However, in case at least one specific area, corresponding to at least one important region, in the image is a small area, the number of pixels included in the important region is also small. Accordingly, errors corresponding to the important region are reflected less on losses so that the important region cannot be learned properly.

SUMMARY OF THE DISCLOSURE

It is an object of the present disclosure to solve all the problems explained above.

It is another object of the present disclosure to provide a method for generating optimized segmentation scores for important regions in the image by assigning large weights to the important regions even if the important regions have a small number of pixels.

In accordance with one aspect of the present disclosure, there is provided a method for image segmentation by using at least one adaptive loss weight map, including steps of: (a) a learning device, when at least one input image is acquired, (i) instructing an encoding layer of a CNN to generate at least one feature map by applying one or more convolution operations to the input image, and (ii) instructing a decoding layer of the CNN to generate each of segmentation scores corresponding to each of pixels of the input image by applying one or more deconvolution operations to the feature map; (b) the learning device instructing a softmax layer of the CNN to generate each of softmax scores corresponding to each of the pixels of the input image by applying softmax operations to each of the segmentation scores; (c) the learning device instructing a loss weight layer of the CNN (i) to generate each of predicted error values corresponding to each of the pixels of the input image by referring to the softmax scores and their corresponding GT values, and (ii) to generate each of loss weight values corresponding to each of the pixels of the input image by applying loss weight operations to each of the predicted error values, wherein the loss weight operations allow differences among each of the loss weight values to be larger than those among each of the predicted error values; and (d) the learning device (i) instructing a softmax loss layer of the CNN (1) to generate each of initial softmax loss values corresponding to each of the pixels of the input image by referring to each of the softmax scores and their corresponding GT values, and (2) to generate each of adjusted softmax loss values corresponding to each of the pixels of the input image by referring to each of the initial softmax loss values and each of the loss weight values, and (ii) learning parameters of the CNN by backpropagating the adjusted softmax loss values.

As one example, at the step of (c), the loss weight operations follow a formula below, loss weight value for i-th pixel=$\alpha_i \times E_i + \beta_i$, wherein $\alpha_i$ is a scaling parameter corresponding to an i-th pixel among the pixels, $E_i$ is the predicted error value corresponding to the i-th pixel among the pixels, $\beta_i$ is a bias parameter corresponding to an i-th pixel among the pixels, i is an integer from 1 to s, and s is the number of the pixels included in the input image.

As one example, at the step of (d), the learning device instructs the softmax loss layer of the CNN to generate each of the adjusted softmax loss values by multiplying each of the loss weight values and its corresponding initial softmax loss value.

As one example, at the step of (d), the initial softmax loss values are generated by operations following a formula below, $$\text{sum of initial softmax loss} = -\frac{1}{S}\sum_{i}^{s} \log(P(i)^{l_i}),$$

wherein, s is the number of the pixels included in the input image, $l_i$ is an one-hot-encoding vector representing to which cluster an i-th pixel belongs on its corresponding GT value, and P(i) is a vector corresponding to a softmax score for the i-th pixel.

As one example, the input image includes information on a road driving circumstance, and wherein the learning device learns the parameters of the CNN by backpropagating the adjusted softmax loss generated by referring to each of the loss weight values and its corresponding initial softmax loss value, on condition that the loss weight layer determines each of the loss weight values by assigning first loss weight values corresponding to at least one lane part of the input image and assigning second loss weight values corresponding to a background part of the input image, the first loss weight values being larger than the second loss weight values.

In accordance with another aspect of the present disclosure, there is provided a testing method for image segmentation by using at least one adaptive loss weight map, including steps of: (a) on condition that (I) a learning device, when at least one training image has been acquired, (i) has instructed an encoding layer of a CNN to generate at least one feature map for training by applying one or more convolution operations to the training image, and (ii) has instructed a decoding layer of the CNN to generate each of segmentation scores for training corresponding to each of pixels of the training image by applying one or more deconvolution operations to the feature map for training; (II) the learning device has instructed a softmax layer of the CNN to generate each of softmax scores for training corresponding to each of the pixels of the training image by applying softmax operations to each of the segmentation scores for training; (III) the learning device has instructed a loss weight layer of the CNN (i) to generate each of predicted error values corresponding to each of the pixels of the training image by referring to the softmax scores for training and their corresponding GT values, and (ii) to generate each of loss weight values corresponding to each of the pixels of the training image by applying loss weight operations to each of the predicted error values, wherein the loss weight operations allow differences among each of the loss weight to be larger than those among each of the predicted error values; and (IV) the learning device (i) has instructed a softmax loss layer of the CNN (1) to generate each of initial softmax loss values corresponding to each of the pixels of the training image by referring to each of the softmax scores for training and their corresponding GT values, and (2) to generate each of adjusted softmax loss values corresponding to each of the pixels of the training image by referring to each of the initial softmax loss values and each of the loss weight values for training, and (ii) has learned parameters of the CNN by backpropagating the adjusted softmax loss values; when at least one test image is acquired, a testing device (i) instructing an encoding layer of a CNN to generate at least one feature map for testing by applying one or more convolution operations to the test image, and (ii) instructing a decoding layer of the CNN to generate each of segmentation scores for testing corresponding to each of pixels of the test image by applying one or more deconvolution operations to the feature map for testing; and (b) the testing device instructing a softmax layer of the CNN to generate each of softmax scores for testing corresponding to each of the pixels of the test image by applying softmax operations to each of the segmentation scores for testing.

In accordance with still another aspect of the present disclosure, there is provided a learning device for image segmentation by using at least one adaptive loss weight map, including: at least one memory that stores instructions; and at least one processor configured to execute the instructions to: perform processes of (I) (i) instructing an encoding layer of a CNN to generate at least one feature map by applying one or more convolution operations to at least one input image, and (ii) instructing a decoding layer of the CNN to generate each of segmentation scores corresponding to each of pixels of the input image by applying one or more deconvolution operations to the feature map, (II) instructing a softmax layer of the CNN to generate each of softmax scores corresponding to each of the pixels of the input image by applying softmax operations to each of the segmentation scores, (III) instructing a loss weight layer of the CNN (i) to generate each of predicted error values corresponding to each of the pixels of the input image by referring to the softmax scores and their corresponding GT values, and (ii) to generate each of loss weight values corresponding to each of the pixels of the input image by applying loss weight operations to each of the predicted error values, wherein the loss weight operations allow differences among each of the loss weight values to be larger than those among each of the predicted error values, and (IV) (i) instructing a softmax loss layer of the CNN (1) to generate each of initial softmax loss values corresponding to each of the pixels of the input image by referring to each of the softmax scores and their corresponding GT values, and (2) to generate each of adjusted softmax loss values corresponding to each of the pixels of the input image by referring to each of the initial softmax loss values and each of the loss weight values, and (ii) learning parameters of the CNN by backpropagating the adjusted softmax loss values.

As one example, at the process of (III), the loss weight operations follow a formula below, loss weight value for i-th pixel=$\alpha_i \times E_i + \beta_i$, wherein $\alpha_i$ is a scaling parameter corresponding to an i-th pixel among the pixels, $E_i$ is the predicted error value corresponding to the i-th pixel among the pixels, $\beta_i$ is a bias parameter corresponding to an i-th pixel among the pixels, i is an integer from 1 to s, and s is the number of the pixels included in the input image.

As one example, at the process of (IV), the processor instructs the softmax loss layer of the CNN to generate each of the adjusted softmax loss values by multiplying each of the loss weight values and its corresponding initial softmax loss value.

As one example, at the process of (IV), the initial softmax loss values are generated by operations following a formula below, $$\text{sum of initial softmax loss} = -\frac{1}{S}\sum_{i}^{s} \log(P(i)^{l_i})$$

wherein, s is the number of the pixels included in the input image, $l_i$ is an one-hot-encoding vector representing to which cluster an i-th pixel belongs on its corresponding GT value, and P(i) is a vector corresponding to a softmax score for the i-th pixel.

As one example, the input image includes information on a road driving circumstance, and wherein the processor learns the parameters of the CNN by backpropagating the adjusted softmax loss generated by referring to each of the loss weight values and its corresponding initial softmax loss value, on condition that the loss weight layer determines each of the loss weight values by assigning first loss weight values corresponding to at least one lane part of the input image and assigning second loss weight values corresponding to a background part of the input image, the first loss weight values being larger than the second loss weight values.

In accordance with still yet another aspect of the present disclosure, there is provided a testing device for image segmentation by using at least one adaptive loss weight map, comprising: at least one memory that stores instructions; and at least one processor, on condition that (I) a learning device, when at least one training image has been acquired, (i) has instructed an encoding layer of a CNN to generate at least one feature map for training by applying one or more convolution operations to the training image, and (ii) has instructed a decoding layer of the CNN to generate each of segmentation scores for training corresponding to each of pixels of the training image by applying one or more deconvolution operations to the feature map for training; (II) the learning device has instructed a softmax layer of the CNN to generate each of softmax scores for training corresponding to each of the pixels of the training image by applying softmax operations to each of the segmentation scores for training; (III) the learning device has instructed a loss weight layer of the CNN (i) to generate each of predicted error values corresponding to each of the pixels of the training image by referring to the softmax scores for training and their corresponding GT values, and (ii) to generate each of loss weight values corresponding to each of the pixels of the training image by applying loss weight operations to each of the predicted error values, wherein the loss weight operations allow differences among each of the loss weight to be larger than those among each of the predicted error values; and (IV) the learning device (i) has instructed a softmax loss layer of the CNN (1) to generate each of initial softmax loss values corresponding to each of the pixels of the training image by referring to each of the softmax scores for training and their corresponding GT values, and (2) to generate each of adjusted softmax loss values corresponding to each of the pixels of the training image by referring to each of the initial softmax loss values and each of the loss weight values for training, and (ii) has learned parameters of the CNN by backpropagating the adjusted softmax loss values; configured to execute the instructions to: perform processes of (I) (i) instructing an encoding layer of a CNN to generate at least one feature map for testing by applying one or more convolution operations to at least one test image, and (ii) instructing a decoding layer of the CNN to generate each of segmentation scores for testing corresponding to each of pixels of the test image by applying one or more deconvolution operations to the feature map for testing, and (II) instructing a softmax layer of the CNN to generate each of softmax scores for testing corresponding to each of the pixels of the test image by applying softmax operations to each of the segmentation scores for testing.

BRIEF DESCRIPTION OF THE DRAWINGS

The drawings attached below to explain example embodiments of the present disclosure are only part of example embodiments of the present disclosure and other drawings may be obtained based on the drawings without inventive work for those skilled in the art.

DETAILED DESCRIPTION OF THE PREFERRED EMBODIMENTS

Figure 1:
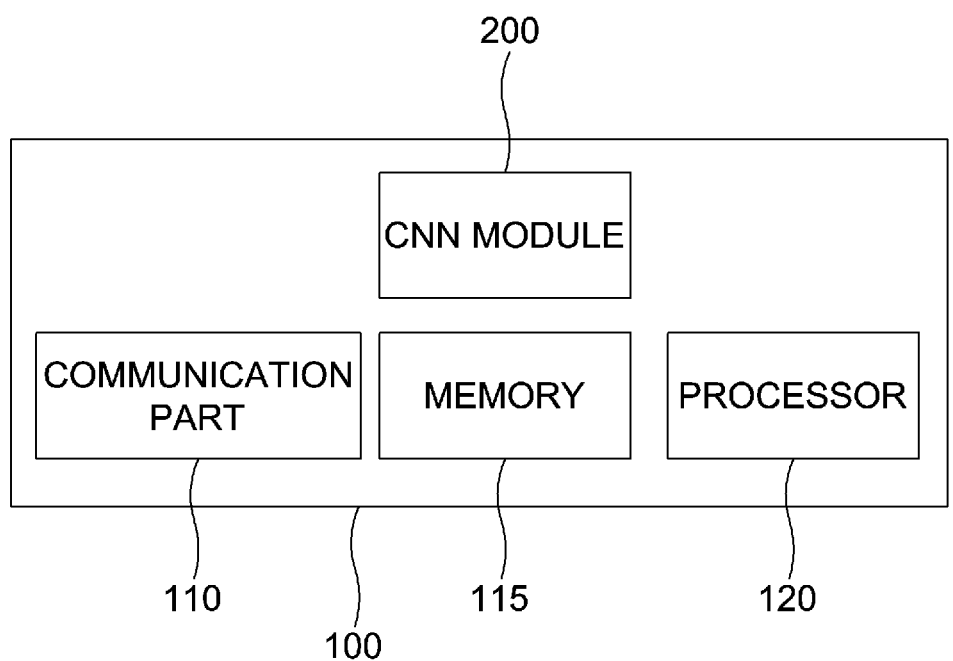
FIG. 1 shows a configuration of a learning device in accordance with the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 shows a configuration of a learning device in accordance with the present disclosure.

By referring to FIG. 1, a learning device 100 may include a CNN 200. Functions of inputting and outputting various data and those of operating various data by the CNN 200 may be performed by a communication part 110 and a processor 120 therein respectively. But, in FIG. 1, detailed explanation on how the communication part 110 and the processor 120 are connected is omitted. In addition, the learning device may further include a memory 115 capable of storing computer readable instructions for performing following processes. As one example, the processor, the memory, a medium, etc. may be integrated with an integrated processor.

Figure 2:
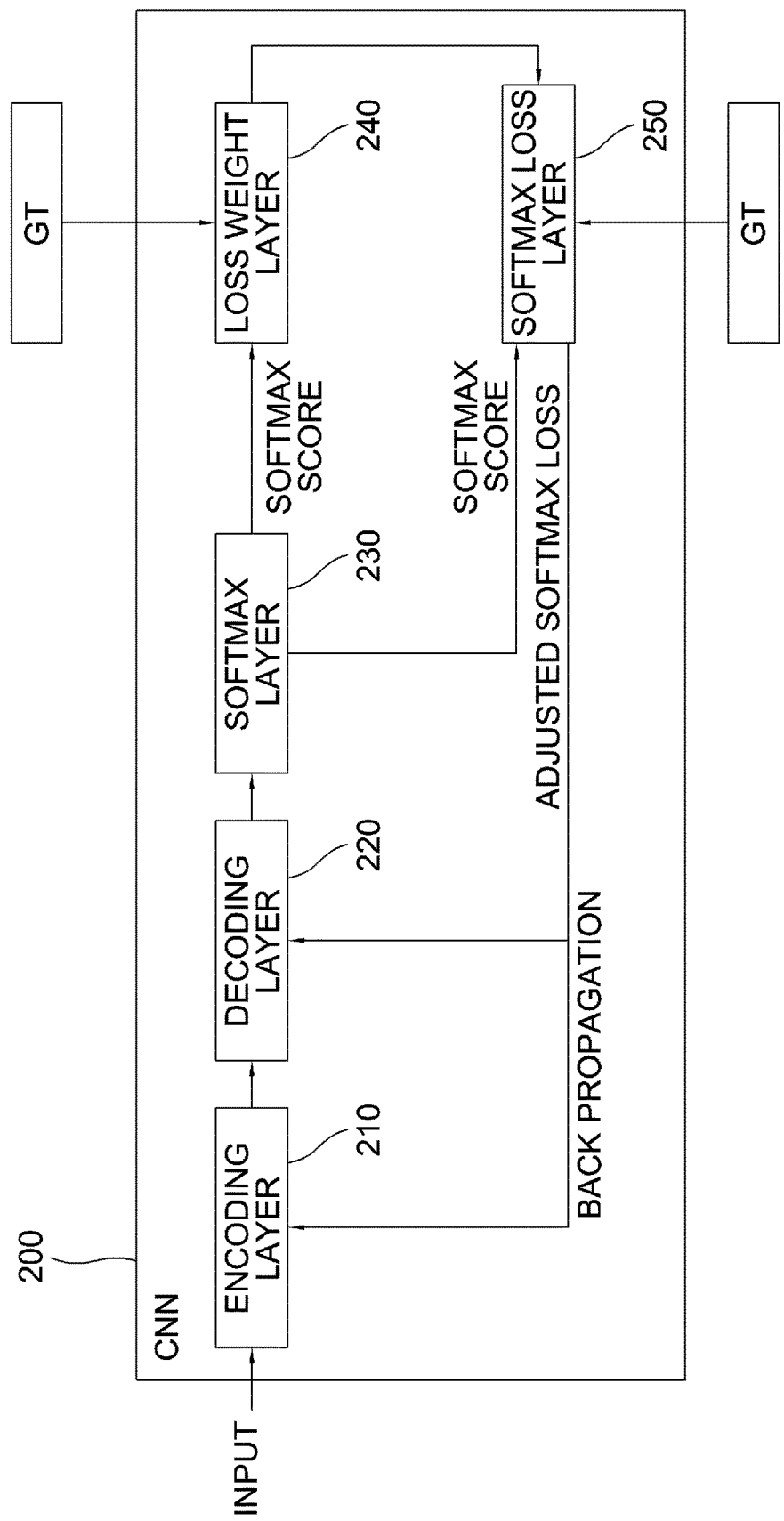
FIG. 2 shows a configuration of a CNN and a learning process using the CNN in accordance with the present disclosure.

FIG. 2 shows a configuration of a CNN and a learning process using the CNN in accordance with the present disclosure.

By referring to FIG. 2, the CNN 200 may include an encoding layer 210, a decoding layer 220, a softmax layer 230, a loss weight layer 240 and a softmax loss layer 250.

Specifically, when at least one input image is acquired by the communication part 110, the learning device 100 may instruct the encoding layer 210 to generate at least one encoded feature map by applying one or more convolution operations to the input image, and the decoding layer 220 to generate each of segmentation scores corresponding to each of pixels of the input image by applying one or more deconvolution operations to the encoded feature map outputted from the encoding layer 210. Herein, the encoded feature map outputted from the encoding layer 210 may be a feature map which is finally outputted from the encoding layer 210 among all the feature maps, but it may not be limited to this.

The softmax layer 230 may generate softmax scores by applying softmax operations, which normalize the segmentation scores so that each of their corresponding softmax scores is outputted as a probability from 0 to 1, to the segmentation scores. Herein, the segmentation scores may correspond to a decoded feature map outputted finally from the decoding layer 220, but it may not be limited to this.

And, the loss weight layer 240 may generate predicted error values by referring to the softmax scores and their corresponding GT values, and may generate loss weight values by applying loss weight operations to the predicted error values. The loss weight operations may be explained later by referring to FIG. 3 and FIG. 4.

The softmax loss layer 250 may generate initial softmax loss values by referring to the softmax scores and their corresponding GT values, and may generate adjusted softmax loss values by referring to the initial softmax loss values and the loss weight values. After that, the learning device 100 may learn parameters of the CNN 200 by backpropagating the adjusted softmax loss values.

Above the configuration of the CNN 200 and a brief learning process in accordance with the present disclosure was explained, a specific training process of the present disclosure will be explained in detail.

Since operations processed in the encoding layer 210, the decoding layer 220, and the softmax layer 230 were explained, a process of generating predicted error values will be explained below.

Figure 3:
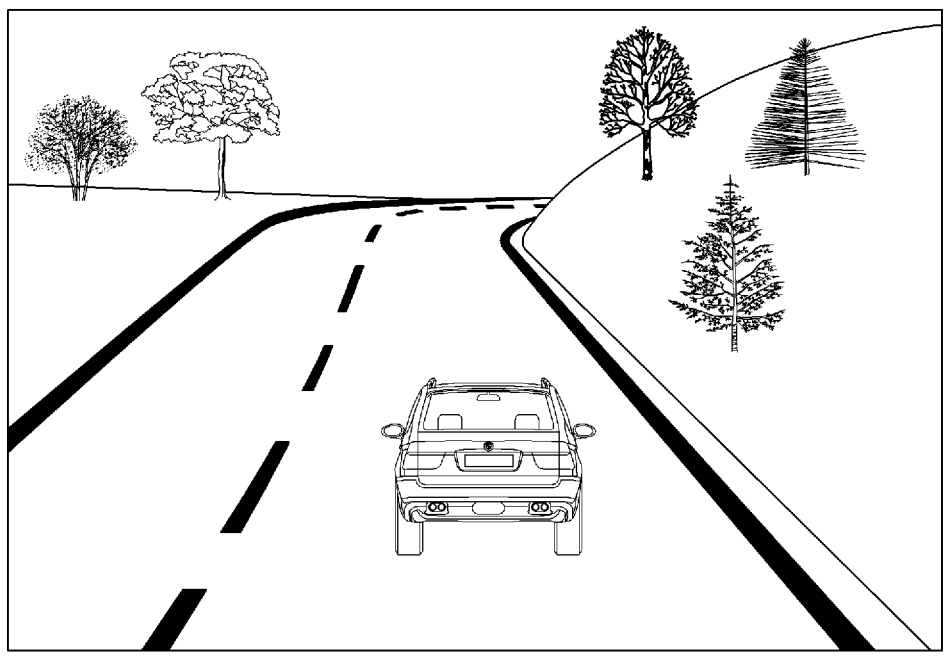
FIG. 3 shows an image which includes important regions with a small number of pixels therein.
Figure 4:
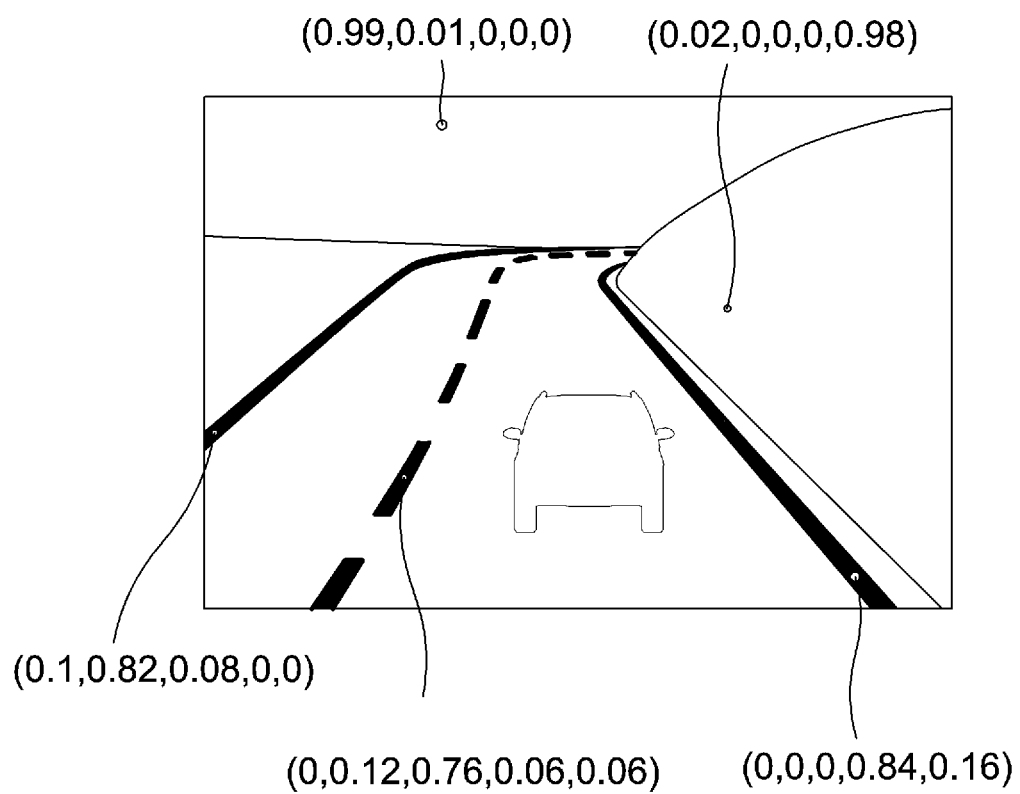
FIG. 4 shows a segmentation result of the input image of FIG. 3.

To explain the process of generating the predicted error values in the loss weight layer 240, FIG. 3 and FIG. 4 can be referred to.

FIG. 3 shows an image which includes important regions with a small number of pixels therein.

By referring to FIG. 3, if an image of FIG. 3 is used for learning a CNN capable of detecting lanes in an autonomous driving circumstance, area of lane parts, which is important for the autonomous driving, is small, in comparison to a sky part on an upper side of the image, a hill part on a right side of the image, and a road area except the lane part on a center of the image. This may cause un-optimized segmentation result due to a small number of pixels in the important regions, i.e., the lane parts. FIG. 4 shows such un-optimized segmentation result.

FIG. 4 shows a segmentation result of the input image of FIG. 3, acquired through the encoding layer 210, the decoding layer 220, and the softmax layer 230.

By referring to FIG. 4, there are so many pixels in the sky part on the upper side of the image and the hill part on the right side of the image so that the CNN 200 can recognize the sky part and the hill part accurately. Accordingly, probabilities assigned to the sky part and the hill part are close to 1, as shown in FIG. 4. However, there are a small number of pixels in the lane parts, as the important regions for the autonomous driving, so that the CNN 200 cannot recognize the lane parts accurately. Accordingly, probabilities assigned to the lane parts are relatively low, e.g., 0.82, 0.76, 0.84, as shown in FIG. 4.

After the softmax scores are generated as shown in FIG. 4, the loss weight layer 240 may generate the predicted error values by referring to the softmax scores and their corresponding GT values. In detail, the loss weight layer 240 may generate the predicted error values by using Euclidean distances between each of the softmax scores corresponding to each of the pixels of the input image and their corresponding GT vectors corresponding to said GT values.

For example, by referring to FIG. 4, a specific softmax score corresponding to a specific pixel on a left lane is (0.1, 0.82, 0.08, 0, 0), and its corresponding GT vector is (0, 1, 0, 0, 0). Then a specific predicted error value for the specific pixel is calculated as $\sqrt{0.1^2+(1-0.82)^2+0.08^2}=0.22$.

Each of the predicted error values may be generated for each of the pixels included in the input image as described above. Then, it may be self-evident that predicted error values corresponding to pixels included in the background parts (such as the hill, the sky, the road area except the lane part on FIG. 3) will be smaller because the background parts are predicted more accurately by the CNN 200 because the number of the pixels included in the backgrounds is much larger than that included in the lane.

After the CNN 200 instructs the loss weight layer 240 to generate the predicted error values as above, the CNN 200 again instructs the loss weight layer 240 to generate the loss weight values by applying the loss weight operations to the predicted error values. Herein, the loss weight operations allow differences among each of the loss weight values larger than those among each of the predicted error values. This characteristic is to reflect the errors of the important regions on the losses thereof with more weight in spite of the small number of pixels therein. It will be explained in detail.

As one example method of generating the loss weight values, it may follow a formula below, loss weight value for $i$-th pixel=$\alpha_i \times E_i + \beta_i$ wherein $\alpha_i$ is a scaling parameter bigger than 1, $E_i$ is the predicted error value corresponding to an i-th pixel among the pixels, $\beta_i$ is a bias parameter, i is an integer from 1 to s, and s is the number of the pixels included in the input image. Since $\alpha_i$ is bigger than 1, the characteristic of the loss weight operations explained above may be achieved.

Meanwhile, the reason why the bias parameter $\beta_i$ is included in the formula, even though only scaling parameter $\alpha_i$ is related to the characteristic above, is that the predicted error values corresponding to the background parts are close to 0 so that it may cause some distortion to the adjusted softmax loss values, which will be explained later, because the loss weight values corresponding to the background parts will be close to 0.

The loss weight values are provided to the softmax loss layer 250. Then, the softmax loss layer 250 may generate the adjusted softmax loss values by referring to the loss weight values and the initial softmax loss values. Explanation on a process of generating the initial softmax loss values is as follows.

First, the CNN 200 may instruct the softmax loss layer 250 to acquire the softmax scores outputted from the softmax layer 230. Then, the softmax loss layer 250 may generate the initial softmax loss values by referring to the softmax scores and their corresponding GT values. Even though the values to be referred to when generating the initial softmax loss is the same as the values referred to when generating the loss weight values, the two generation processes are totally different, as can be seen below.

$$\text{sum of initial softmax loss} = -\frac{1}{S}\sum_i^s \log(P(i)^{l_i})$$

The initial softmax loss values may be generated by referring to the formula above, wherein, $l_i$ is an one-hot-encoding vector representing to which cluster the i-th pixel belongs on its corresponding GT value, and P(i) is a vector corresponding to a softmax score for the i-th pixel.

Specifically, the biggest element of P(i) represents a predicted result of which cluster the i-th pixel belongs to, and $l_i$ is the one-hot-encoding vector which is a correct answer vector. In each iteration of sigma operation, inner product operation is applied to P(i) and $l_i$.

For example, by referring to FIG. 4, P(i) corresponding to the i-th pixel included in the left lane is (0.1, 0.82, 0.08, 0, 0), and the corresponding $l_i$ is (0, 1, 0, 0, 0). Then, the initial softmax loss value corresponding to the i-th pixel will be −log(0.82).

After the initial softmax loss values are generated as described above, the softmax loss layer 250 may generate the adjusted softmax loss values by referring to the initial softmax loss values and the loss weight values.

Herein, the adjusted softmax loss values are generated by multiplying the loss weight values and the initial softmax loss values. Since the loss weight values corresponding to the background parts are adjusted to be small, and those corresponding to the lane part are adjusted to be large, the errors corresponding to the lane parts are reflected highly on the adjusted softmax loss values due to multiplication of the loss weight values and the initial softmax loss values.

The learning device 100 may learn the parameters of the CNN 200 by backpropating the adjusted softmax loss values, on which the errors corresponding to the important regions are reflected highly, so that parts with the small number of pixels in the input image may be accurately segmented.

The learning process in accordance with the present disclosure is explained above, a configuration of the testing device of the present disclosure will be explained.

For reference, in the description below, the phrase "for training" is added for terms related to the learning processes, and the phrase "for testing" is added for terms related to testing processes, to avoid possible confusion.

First, the communication part 110 acquires at least one test image, on condition that (I) the learning device 100, when at least one training image has been acquired, (i) has instructed the encoding layer 210 of the CNN 200 to generate at least one feature map for training by applying the one or more convolution operations to the training image, and (ii) has instructed the decoding layer 220 of the CNN 200 to generate each of the segmentation scores for training corresponding to each of the pixels of the training image by applying the one or more deconvolution operations to the feature map for training; (II) the learning device 100 has instructed the softmax layer 230 of the CNN 200 to generate each of the softmax scores for training corresponding to each of the pixels of the training image by applying the softmax operations to each of the segmentation scores for training; (III) the learning device 100 has instructed the loss weight layer 240 of the CNN 200 (i) to generate each of the predicted error values corresponding to each of the pixels of the training image by referring to the softmax scores for training and their corresponding GT values, and (ii) to generate each of the loss weight values corresponding to each of the pixels of the training image by applying the loss weight operations to each of the predicted error values, wherein the loss weight operations allow differences among each of the loss weight to be larger than those among each of the predicted error values; and (IV) the learning device 100 (i) has instructed the softmax loss layer 250 of the CNN 200 (1) to generate each of the initial softmax loss values corresponding to each of the pixels of the training image by referring to each of the softmax scores for training and their corresponding GT values, and (2) to generate each of the adjusted softmax loss values corresponding to each of the pixels of the training image by referring to each of the initial softmax loss values and each of the loss weight values for training, and (ii) has learned the parameters of the CNN by backpropagating the adjusted softmax loss values.

Second, the processor 120 performs a process of (i) instructing the encoding layer 210 of the CNN 200 to generate at least one feature map for testing by applying the one or more convolution operations to the test image, and (ii) instructing the decoding layer 220 of the CNN 200 to generate each of segmentation scores for testing corresponding to each of pixels of the test image by applying the one or more deconvolution operations to the feature map for testing.

Finally, the processor 120 instructs the softmax layer 230 of the CNN 200 to generate each of softmax scores for testing corresponding to each of the pixels of the test image by applying the softmax operations to each of the segmentation scores for testing.

Because the parameters of the CNN 200 has been learned at the time of testing, the processes of generating the loss values and backpropagating the loss values are omitted. Accordingly, the configuration of the testing device is the same to the configuration of the learning device 100 except the part for generating the loss values. Therefore, from the encoding layer 210 to the softmax layer 230, which are the parts for generating the softmax scores, may be the configuration of the testing device.

The above described method for an attention-driven image segmentation by using at least one adaptive loss weight map may be used for updating HD maps required to satisfy level 4 of autonomous vehicles. By this method, vague objects such as lanes and road markers at distance may be detected more accurately. Also, this method can be usefully performed in military, where identification of friend or foe is important, by distinguishing aircraft marks or military uniforms at distance.

The objects of the technical solution of the present disclosure or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present disclosure or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present disclosure and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present disclosure has been explained by specific matters such as detailed components, limited embodiments, and drawings. While the disclosure has been shown and described with respect to the preferred embodiments, it, however, will be understood by those skilled in the art that various changes and modification may be made without departing from the spirit and scope of the disclosure as defined in the following claims.

Accordingly, the thought of the present disclosure must not be confined to the explained embodiments, and the following patent claims as well as everything including variants equal or equivalent to the patent claims pertain to the category of the thought of the present disclosure.

What is claimed is:

1. A method for image segmentation by using at least one adaptive loss weight map, comprising steps of:
   (a) a learning device, when at least one input image is acquired, (i) instructing an encoding layer of a CNN to generate at least one feature map by applying one or more convolution operations to the input image, and (ii) instructing a decoding layer of the CNN to generate each of segmentation scores corresponding to each of pixels of the input image by applying one or more deconvolution operations to the feature map;
   (b) the learning device instructing a softmax layer of the CNN to generate each of softmax scores corresponding to each of the pixels of the input image by applying softmax operations to each of the segmentation scores;
   (c) the learning device instructing a loss weight layer of the CNN (i) to generate each of predicted error values corresponding to each of the pixels of the input image by referring to the softmax scores and their corresponding GT values, and (ii) to generate each of loss weight values corresponding to each of the pixels of the input image by applying loss weight operations to each of the predicted error values, wherein the loss weight operations allow differences among each of the loss weight values to be larger than those among each of the predicted error values; and
   (d) the learning device (i) instructing a softmax loss layer of the CNN (1) to generate each of initial softmax loss values corresponding to each of the pixels of the input image by referring to each of the softmax scores and their corresponding GT values, and (2) to generate each of adjusted softmax loss values corresponding to each of the pixels of the input image by referring to each of the initial softmax loss values and each of the loss weight values, and (ii) learning parameters of the CNN by backpropagating the adjusted softmax loss values.

2. The method of claim 1, wherein, at the step of (c), the loss weight operations follow a formula below, $$\text{loss weight value for } i\text{-th pixel} = \alpha_i \times E_i + \beta_i$$

wherein $\alpha_i$ is a scaling parameter corresponding to an i-th pixel among the pixels, $E_i$ is the predicted error value corresponding to the i-th pixel among the pixels, $\beta_i$ is a bias parameter corresponding to an i-th pixel among the pixels, i is an integer from 1 to s, and s is the number of the pixels included in the input image.

3. The method of claim 1, wherein, at the step of (d), the learning device instructs the softmax loss layer of the CNN to generate each of the adjusted softmax loss values by multiplying each of the loss weight values and its corresponding initial softmax loss value.

4. The method of claim 1, wherein, at the step of (d), initial softmax loss values are generated by operations following a formula below, $$\text{sum of initial softmax loss} = -\frac{1}{S}\sum_i^s \log(P(i)^{l_i})$$

wherein, s is the number of the pixels included in the input image, $l_i$ is an one-hot-encoding vector representing to which cluster an i-th pixel belongs on its corresponding GT value, and P(i) is a vector corresponding to a softmax score for the i-th pixel.

5. The method of claim 1, wherein the input image includes information on a road driving circumstance, and wherein the learning device learns the parameters of the CNN by backpropagating the adjusted softmax loss generated by referring to each of the loss weight values and its corresponding initial softmax loss value, on condition that the loss weight layer determines each of the loss weight values by assigning first loss weight values corresponding to at least one lane part of the input image and assigning second loss weight values corresponding to a background part of the input image, the first loss weight values being larger than the second loss weight values.

6. A testing method for image segmentation by using at least one adaptive loss weight map, comprising steps of:
   (a) on condition that (I) a learning device, when at least one training image has been acquired, (i) has instructed an encoding layer of a CNN to generate at least one feature map for training by applying one or more convolution operations to the training image, and (ii)

has instructed a decoding layer of the CNN to generate each of segmentation scores for training corresponding to each of pixels of the training image by applying one or more deconvolution operations to the feature map for training; (II) the learning device has instructed a softmax layer of the CNN to generate each of softmax scores for training corresponding to each of the pixels of the training image by applying softmax operations to each of the segmentation scores for training; (III) the learning device has instructed a loss weight layer of the CNN (i) to generate each of predicted error values corresponding to each of the pixels of the training image by referring to the softmax scores for training and their corresponding GT values, and (ii) to generate each of loss weight values corresponding to each of the pixels of the training image by applying loss weight operations to each of the predicted error values, wherein the loss weight operations allow differences among each of the loss weight to be larger than those among each of the predicted error values; and (IV) the learning device (i) has instructed a softmax loss layer of the CNN (1) to generate each of initial softmax loss values corresponding to each of the pixels of the training image by referring to each of the softmax scores for training and their corresponding GT values, and (2) to generate each of adjusted softmax loss values corresponding to each of the pixels of the training image by referring to each of the initial softmax loss values and each of the loss weight values for training, and (ii) has learned parameters of the CNN by backpropagating the adjusted softmax loss values; when at least one test image is acquired, a testing device (i) instructing an encoding layer of a CNN to generate at least one feature map for testing by applying one or more convolution operations to the test image, and (ii) instructing a decoding layer of the CNN to generate each of segmentation scores for testing corresponding to each of pixels of the test image by applying one or more deconvolution operations to the feature map for testing; and (b) the testing device instructing a softmax layer of the CNN to generate each of softmax scores for testing corresponding to each of the pixels of the test image by applying softmax operations to each of the segmentation scores for testing.

7. A learning device for image segmentation by using at least one adaptive loss weight map, comprising:
at least one memory that stores instructions; and
at least one processor configured to execute the instructions to: perform processes of (I) (i) instructing an encoding layer of a CNN to generate at least one feature map by applying one or more convolution operations to the input image, and (ii) instructing a decoding layer of the CNN to generate each of segmentation scores corresponding to each of pixels of the input image by applying one or more deconvolution operations to the feature map, (II) instructing a softmax layer of the CNN to generate each of softmax scores corresponding to each of the pixels of the input image by applying softmax operations to each of the segmentation scores, (III) instructing a loss weight layer of the CNN (i) to generate each of predicted error values corresponding to each of the pixels of the input image by referring to the softmax scores and their corresponding GT values, and (ii) to generate each of loss weight values corresponding to each of the pixels of the input image by applying loss weight operations to each of the predicted error values, wherein the loss weight operations allow differences among each of the loss weight values to be larger than those among each of the predicted error values, and (IV) (i) instructing a softmax loss layer of the CNN (1) to generate each of initial softmax loss values corresponding to each of the pixels of the input image by referring to each of the softmax scores and their corresponding GT values, and (2) to generate each of adjusted softmax loss values corresponding to each of the pixels of the input image by referring to each of the initial softmax loss values and each of the loss weight values, and (ii) learning parameters of the CNN by backpropagating the adjusted softmax loss values.

8. The learning device of claim 7, wherein, at the process of (III), the loss weight operations follow a formula below, loss weight value for $i$-th pixel$=\alpha_i \times E_i + \beta_i$ wherein $\alpha_i$ is a scaling parameter corresponding to an i-th pixel among the pixels, $E_i$ is the predicted error value corresponding to the i-th pixel among the pixels, $\beta_i$ is a bias parameter corresponding to an i-th pixel among the pixels, i is an integer from 1 to s, and s is the number of the pixels included in the input image.

9. The learning device of claim 7, wherein, at the process of (IV), the processor instructs the softmax loss layer of the CNN to generate each of the adjusted softmax loss values by multiplying each of the loss weight values and its corresponding initial softmax loss value.

10. The learning device of claim 7, wherein, at the process of (IV), the initial softmax loss values are generated by operations following a formula below, $$\text{sum of initial softmax loss} = -\frac{1}{S}\sum_i^s \log(P(i)^{l_i})$$

wherein, s is the number of the pixels included in the input image, $l_i$ is an one-hot-encoding vector representing to which cluster an i-th pixel belongs on its corresponding GT value, and P(i) is a vector corresponding to a softmax score for the i-th pixel.

11. The learning device of claim 7, wherein the input image includes information on a road driving circumstance, and
wherein the processor learns the parameters of the CNN by backpropagating the adjusted softmax loss generated by referring to each of the loss weight values and its corresponding initial softmax loss value, on condition that the loss weight layer determines each of the loss weight values by assigning first loss weight values corresponding to at least one lane part of the input image and assigning second loss weight values corresponding to a background part of the input image, the first loss weight values being larger than the second loss weight values.

12. A testing device for image segmentation by using at least one adaptive loss weight map, comprising:
at least one memory that stores instructions; and
at least one processor, on condition that (I) a learning device, when at least one training image has been acquired, (i) has instructed an encoding layer of a CNN to generate at least one feature map for training by applying one or more convolution operations to the training image, and (ii) has instructed a decoding layer of the CNN to generate each of segmentation scores for training corresponding to each of pixels of the training image by applying one or more deconvolution operations to the feature map for training; (II) the learning device has instructed a softmax layer of the CNN to generate each of softmax scores for training corresponding to each of the pixels of the training image by applying softmax operations to each of the segmentation scores for training; (III) the learning device has instructed a loss weight layer of the CNN (i) to generate each of predicted error values corresponding to each of the pixels of the training image by referring to the softmax scores for training and their corresponding GT values, and (ii) to generate each of loss weight values corresponding to each of the pixels of the training image by applying loss weight operations to each of the predicted error values, wherein the loss weight operations allow differences among each of the loss weight to be larger than those among each of the predicted error values; and (IV) the learning device (i) has instructed a softmax loss layer of the CNN (1) to generate each of initial softmax loss values corresponding to each of the pixels of the training image by referring to each of the softmax scores for training and their corresponding GT values, and (2) to generate each of adjusted softmax loss values corresponding to each of the pixels of the training image by referring to each of the initial softmax loss values and each of the loss weight values for training, and (ii) has learned parameters of the CNN by backpropagating the adjusted softmax loss values; configured to execute the instructions to: perform processes of (I) (i) instructing an encoding layer of a CNN to generate at least one feature map for testing by applying one or more convolution operations to at least one test image, and (ii) instructing a decoding layer of the CNN to generate each of segmentation scores for testing corresponding to each of pixels of the test image by applying one or more deconvolution operations to the feature map for testing, and (II) instructing a softmax layer of the CNN to generate each of softmax scores for testing corresponding to each of the pixels of the test image by applying softmax operations to each of the segmentation scores for testing.

\* \* \* \* \*